(12) United States Patent
Zhang et al.

(10) Patent No.: US 12,432,788 B2
(45) Date of Patent: *Sep. 30, 2025

(54) METHODS, APPARATUS AND SYSTEMS FOR INDICATING INFORMATION IN A RANDOM ACCESS PROCEDURE

(71) Applicant: ZTE Corporation, Shenzhen (CN)

(72) Inventors: Junfeng Zhang, Shenzhen (CN); Li Tian, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,165

(22) Filed: Apr. 25, 2024

(65) Prior Publication Data

US 2024/0276561 A1 Aug. 15, 2024

Related U.S. Application Data (63) Continuation of application No. 17/466,316, filed on Sep. 3, 2021, now Pat. No. 11,991,758, which is a
(Continued)

(51) Int. Cl.
*H04W 74/0833* (2024.01)
*H04L 5/00* (2006.01)
(Continued)

(52) U.S. Cl.
CPC ....... *H04W 74/0841* (2013.01); *H04L 5/0053* (2013.01); *H04W 74/006* (2013.01);
(Continued)

(58) Field of Classification Search
CPC .......... H04W 74/0841; H04W 74/006; H04W 80/02; H04W 74/0833; H04L 5/0053
See application file for complete search history.

(56) References Cited

U.S. PATENT DOCUMENTS 11,089,629 B2    8/2021  Zhang et al.
11,432,324 B2 *  8/2022  Lei ......................... H04L 5/0055
(Continued)

FOREIGN PATENT DOCUMENTS

WO    WO 2018/054163 A1    3/2018
WO    WO 2018/066934 A2    4/2018
(Continued)

OTHER PUBLICATIONS

"3$^{rd}$ Generation Partnership Project, Medium Access Control (MAC) protocol specification", Technical Specification Group Radio Access Network; NR; release 15, 3GPP TS 38.321 v.15.4.0, Dec. 2018, 779p.
(Continued)

*Primary Examiner* — Habte Mered
(74) *Attorney, Agent, or Firm* — Crowell & Moring LLP (57) ABSTRACT

Methods, apparatus and systems for indicating information in a random access procedure. In one embodiment, a method performed by a wireless communication device is disclosed. The method includes: transmitting, to a wireless communication node, a first message including a preamble and a payload for an access to the wireless communication node; and receiving, from the wireless communication node, a second message including a response to the first message, the second message including an indication indicating a type of the response selected from a plurality of types.

14 Claims, 10 Drawing Sheets

Related U.S. Application Data continuation of application No. PCT/CN2019/076822, filed on Mar. 4, 2019.

(51) Int. Cl.
  *H04W 74/00* (2009.01)
  *H04W 74/0836* (2024.01)
  *H04W 80/02* (2009.01)

(52) U.S. Cl.
  CPC .... *H04W 74/0833* (2013.01); *H04W 74/0836* (2024.01); *H04W 80/02* (2013.01)

(56) References Cited

U.S. PATENT DOCUMENTS

| | | | |
|---|---|---|---|
| 2018/0103465 A1 | 4/2018 | Agiwal et al. | |
| 2018/0116000 A1 | 4/2018 | Ly et al. | |
| 2018/0359784 A1* | 12/2018 | Agiwal | H04W 74/0833 |
| 2019/0075598 A1 | 3/2019 | Li et al. | |
| 2020/0146054 A1 | 5/2020 | Jeon et al. | |
| 2020/0260485 A1* | 8/2020 | Lei | H04W 72/23 |
| 2021/0410191 A1 | 12/2021 | Wu | |
| 2022/0190906 A1* | 6/2022 | Haghighat | H04W 24/08 |
| 2022/0279583 A1 | 9/2022 | Yao et al. | |

FOREIGN PATENT DOCUMENTS

| | | |
|---|---|---|
| WO | WO 2018/081385 A1 | 5/2018 |
| WO | WO 2018/127042 A1 | 7/2018 |
| WO | WO 2020/034319 A1 | 2/2020 |

OTHER PUBLICATIONS

Japanese Office Action with English translation, Dec. 27, 2024, pp. 1-4, issued in Patent Application No. 2023-204629.

International Search Report for priority application No. PCT/CN2019/076822, dated Nov. 28, 2019, 3p.

Written Opinion of the International Searching Authority for priority application No. PCT/CN2019/076822, dated Nov. 28, 2019, 4p.

Extended European Search Report for priority application No. PCT/CN2019/076822 dated Sep. 9, 2022, 10p.

ZTE et al., "Considerations on 2-Step RACH Procedures", 3GPP TSG RAN WG1 Meeting #96, Feb. 25-Mar. 1, 2019, R1-1901627, 11p, GR.

Intel Corporation, "Procedure for two-step RACH", 3GPP TSG RAN WG1 Meeting #96, Feb. 25-Mar. 1, 2019, R1-1902467, 5p, GR.

Motorola Mobility et al., "2-step RACH procedure", 3GPP TSG RAN WG1 Meeting #96, Feb. 25-Mar. 1, 2019, R1-1902843, 3p, GR.

"3rd Generation Partnership Project, Medium Access Control (MAC) protocol specification", Technical Specification Group Radio Access Network; NR; release 15, 3GPP TS 38.321 v.15.4.0, Dec. 2018, 77p.

Official Action for corresponding Japanese application No. 2021-552158 mailed Jan. 30, 2023, 2p, in Japanese language.

English language translation of Notice of Reasons for Rejection for corresponding Japanese application No. 2021-552158 mailed Jan. 30, 2023, 5p.

CATT, "Consideration on 2-step RA", 3GPP TSG RAN WG2 Meeting Ad Hoc, R2-1700205, Jan. 19, 2017, 6p, US.

Final Office Action for corresponding Japanese application No. 2021-552158 dated Jul. 28, 2023, 4p, in Japanese language.

English language translation of Final Office Action for corresponding Japanese application No. 2021-552158 dated Jul. 28, 2023, 4p.

Office Action for corresponding Indian application No. P00202108279 dated Sep. 8, 2023, 4p, in English and Indian languages.

\* cited by examiner

METHODS, APPARATUS AND SYSTEMS FOR INDICATING INFORMATION IN A RANDOM ACCESS PROCEDURE

RELATED APPLICATION

This application is a continuation of U.S. patent application Ser. No. 17/466,316, filed Sep. 3, 2021, which is a continuation of International Application No. PCT/CN2019/076822, filed on Mar. 4, 2019. The entireties of the above applications are hereby incorporated by reference.

TECHNICAL FIELD

The disclosure relates generally to wireless communications and, more particularly, to methods, apparatus and systems for indicating information in a random access procedure in a wireless communication.

BACKGROUND

In both the fourth Generation (4G) and the fifth Generation (5G) new radio (NR) mobile networks, before a user equipment (UE) sends data to a base station (BS), the UE needs to obtain uplink synchronization and downlink synchronization with the BS. The uplink timing synchronization may be achieved by performing a random access procedure.

Figure 1:
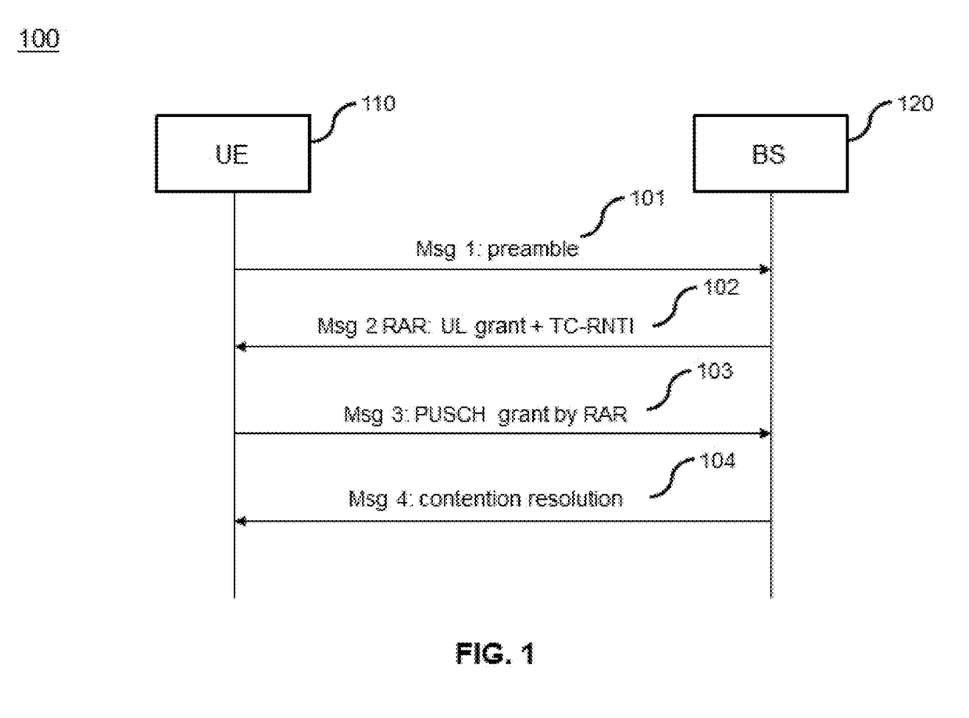
FIG. 1 illustrates an exemplary four-step random access procedure.

An exemplary four-step random access procedure 100 is shown in FIG. 1. As shown in FIG. 1, a UE 110 transmits a preamble in Message (Msg) 1 to a BS 120 at operation 101. Once the preamble is received successfully by the BS 120, the BS 120 will send at operation 102 a Msg 2 back to the UE 110, in which a medium access control (MAC) random access response (RAR) is included as a response to the preamble. The MAC RAR may include an uplink (UL) grant and a temporary cell radio network temporary identifier (TC-RNTI). After the MAC RAR is received, the UE 110 transmits Msg 3 at operation 103 to the BS 120 with the physical uplink shared channel (PUSCH) grant carried in the MAC RAR. After the Msg 3 is received, the BS 120 will send the Msg 4 back at operation 104 to the UE 110, in which some kind of contention resolution identity (ID) will be included for the purpose of contention resolution. A communication system merely relying on an initial access procedure as mentioned above will induce latency and cannot meet the needs of faster and newer communications in future network developments.

Thus, existing systems and methods for performing a random access procedure in a wireless communication are not entirely satisfactory.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication device is disclosed. The method includes: transmitting, to a wireless communication node, a first message including a preamble and a payload for an access to the wireless communication node; and receiving, from the wireless communication node, a second message including a response to the first message, the second message including an indication indicating a type of the response selected from a plurality of types.

In another embodiment, a method performed by a wireless communication node is disclosed. The method includes: receiving, from a wireless communication device, a first message including a preamble and a payload for an access to the wireless communication node; and transmitting, to the wireless communication device, a second message including a response to the first message, the second message including an indication indicating a type of the response selected from a plurality of types.

In a different embodiment, a wireless communication node configured to carry out a disclosed method in some embodiment is disclosed. In another embodiment, a wireless communication device configured to carry out a disclosed method in some embodiment is disclosed. In yet another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS.

The present disclosure provides methods for a terminal or a UE to complete access to a BS by a two-step random access channel (RACH) procedure, to accelerate the entire initial access procedure and significantly reduce the overall initial access latency of the communication network. A two-step RACH procedure will complete the random access in two steps. In one embodiment, the UE transmits a first message (referred as Msg A) including both a preamble and a payload to the BS in a first step. The BS will then transmit a second message (referred as Msg B) in response to the first message to the UE to complete the access. In other words, Msg A of two-step RACH merges the equivalent content of Msg 1 and Msg 3 of four-step RACH, and Msg B of two-step RACH merges the equivalent content of Msg 2 and Msg 4 of four-step RACH.

In some embodiments, after the UE transmits the Msg A to the network, the UE receives the response in Msg B which includes an indication for a type or function of each MAC RAR in Msg B. The indication may be carried in the downlink control information (DCI), or in the MAC RAR, or a MAC subheader. In case the indication for the type of MAC RAR is carried in the MAC RAR, the indication bit may be placed before the ordinary RAR content.

The type of MAC RAR in Msg B may be selected from at least one of the following options: a response for normal contention resolution, a response for fall back mode, a response for NACK indication, and a response for Msg 2 of a four-step RACH. The MAC RAR for contention resolution may contain a contention resolution ID carried in the payload of Msg A. The MAC RAR for fall back mode may contain a Msg 3 scheduling message.

In various embodiments, a BS may be referred to as a network side node and can include, or be implemented as, a next Generation Node B (gNB), an E-UTRAN Node B (eNB), a Transmission Reception Point (TRP), an Access Point (AP), a donor node (DN), a relay node, a core network (CN) node, a RAN node, a master node, a secondary node, a distributed unit (DU), a centralized unit (CU), etc. A UE in the present disclosure can be referred to as a terminal and can include, or be implemented as, a mobile station (MS), a station (STA), etc. A BS and a UE may be described herein as non-limiting examples of "wireless communication nodes;" and a UE may be described herein as non-limiting examples of "wireless communication devices." The BS and UE can practice the methods disclosed herein and may be capable of wireless and/or wired communications, in accordance with various embodiments of the present disclosure.

Figure 2:
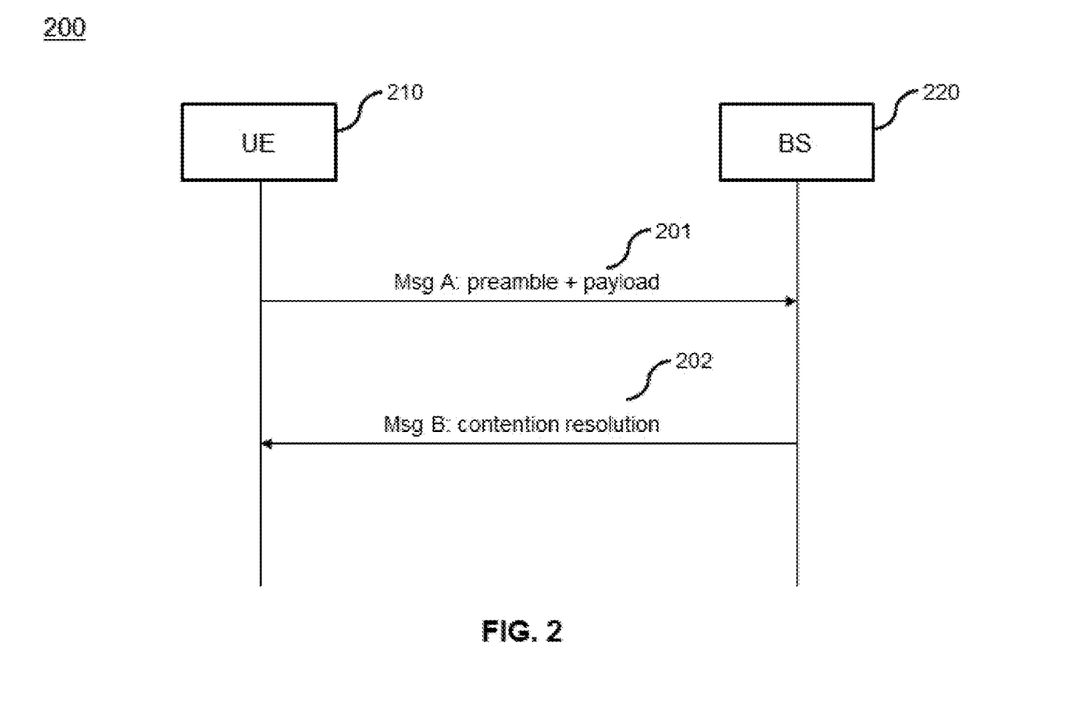
FIG. 2 illustrates an exemplary two-step random access procedure, in accordance with some embodiments of the present disclosure.

FIG. 2 illustrates an exemplary two-step random access procedure 200, in accordance with some embodiments of the present disclosure. A two-step RACH procedure will complete the 4 steps in FIG. 1 in 2 messages or 2 steps. In other words, at least some content of Msg 1 and Msg 3 in the four-step RACH are included in Msg A of the two-step RACH; and at least some content of Msg 2 and Msg 4 are included in Msg B of the two-step RACH. As shown in FIG. 2, a UE 210 transmits, at operation 201, Msg A that includes both a preamble and a payload to a BS 220 for access to the BS 220. Then at operation 202, the BS 220 transmits to the UE 210 Msg B in response to the Msg A.

In one embodiment, the channel structure of Msg A includes preamble and PUSCH carrying payload which includes at least the content of Msg 3 in the traditional 4-step RACH. The Msg B may include the content equivalent to contents of Msg 2 and Msg 4 of 4-step RACH and handle the contention resolution function for 2-step RACH.

When the UE sends the Msg A, the BS needs to distinguish the random access (RA) types to determine whether the UE initiates from a two-step CBRA (contention based RACH) or a four-step CBRA. Otherwise, the BS will always try to decode the payload in each payload occasion and the RAR window will be significantly impacted when the preamble is successfully detected, which is not reasonable in terms of latency and energy efficiency. The RACH type may be indicated based on the used preamble time or frequency resource. The system allocates different available time/frequency resource occasions (ROs) for two-step CBRA and four-step CBRA individually, which can help the BS to distinguish the types of RACH. There may be two sets of parameters of PRACH (physical random access channel) configuration, one set for 2-step RACH and the other set for 4-step RACH. Msg B will be sent from the BS to the UE if the preamble in Msg A has been detected. Depending on whether the payload in Msg A is successfully decoded, the content of Msg B may be different. More details will be described later referring to FIG. 7.

Figure 3:
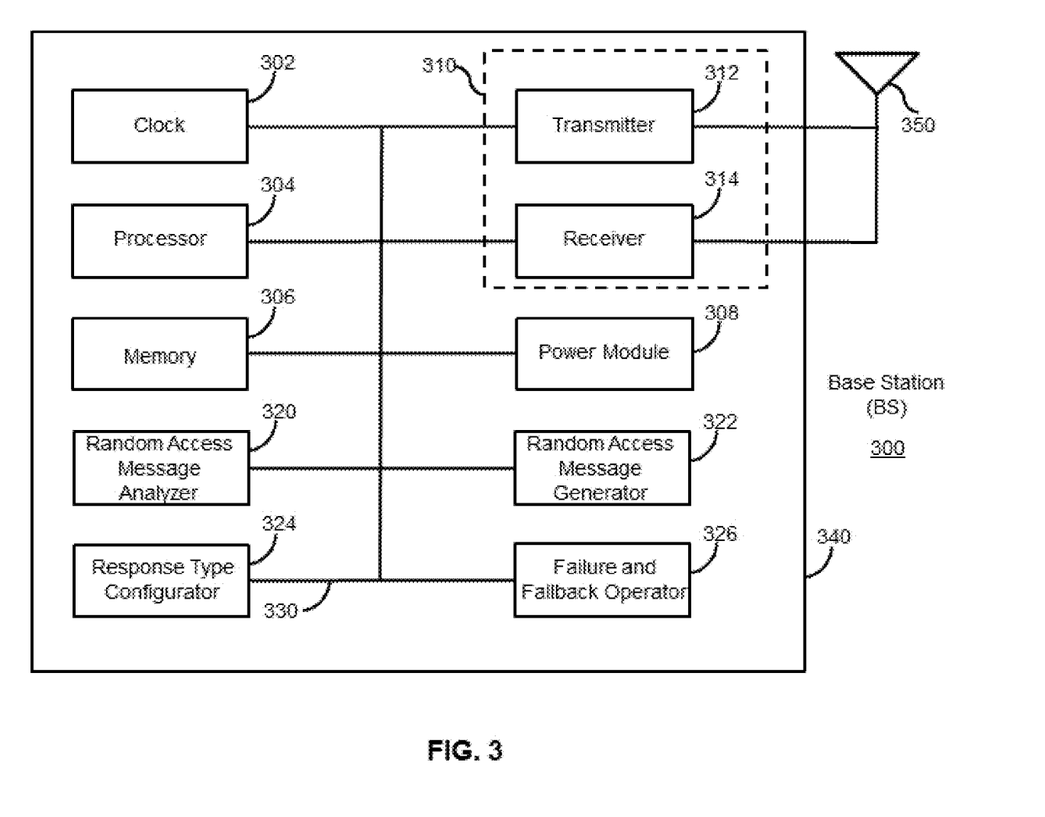
FIG. 3 illustrates a block diagram of a base station (BS), in accordance with some embodiments of the present disclosure.

FIG. 3 illustrates a block diagram of a base station (BS) 300, in accordance with some embodiments of the present disclosure. The BS 300 is an example of a node that can be configured to implement the various methods described herein. As shown in FIG. 3, the BS 300 includes a housing 340 containing a system clock 302, a processor 304, a memory 306, a transceiver 310 including a transmitter 312 and receiver 314, a power module 308, a random access message analyzer 320, a random access message generator 322, a response type configurator 324, and a failure and fallback operator 326.

In this embodiment, the system clock 302 provides the timing signals to the processor 304 for controlling the timing of all operations of the BS 300. The processor 304 controls the general operation of the BS 300 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 306, which can include both read-only memory (ROM) and random access memory (RAM), can provide instructions and data to the processor 304. A portion of the memory 306 can also include non-volatile random access memory (NVRAM). The processor 304 typically performs logical and arithmetic operations based on program instructions stored within the memory 306. The instructions (a.k.a., software) stored in the memory 306 can be executed by the processor 304 to perform the methods described herein. The processor 304 and memory 306 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 310, which includes the transmitter 312 and receiver 314, allows the BS 300 to transmit and receive data to and from a remote device (e.g., another BS or a UE). An antenna 350 is typically attached to the housing 340 and electrically coupled to the transceiver 310. In various embodiments, the BS 300 includes (not shown) multiple transmitters, multiple receivers, and multiple transceivers. In one embodiment, the antenna 350 is replaced with a multi-antenna array 350 that can form a plurality of beams each of which points in a distinct direction. The transmitter 312 can be configured to wirelessly transmit packets having different packet types or functions, such packets being generated by the processor 304. Similarly, the receiver 314 is configured to receive packets having different packet types or functions, and the processor 304 is configured to process packets of a plurality of different packet types. For example, the processor 304 can be configured to determine the type of packet and to process the packet and/or fields of the packet accordingly.

In a communication system including the BS 300 that can serve one or more UEs, the BS 300 may receive a random access request from a UE for access to the BS 300. In one embodiment, the random access message analyzer 320 may receive, via the receiver 314 from the UE, a first message including a preamble and a payload for an access to the BS 300. The random access message analyzer 320 may analyze the first message and inform the random access message generator 322 about the first message for generating a response.

In one embodiment, the random access message generator 322 may generate a second message including a response to the first message. The random access message generator 322 may transmit the second message via the transmitter 312 to the UE. In one embodiment, the second message includes an indication indicating a type of the response selected from a plurality of types.

In one embodiment, the indication is carried in downlink control information (DCI). In another embodiment, the indication is carried in a subheader in a header of the second message. The header includes at least one subheader. In one example, the indication is carried by at least one additional bit added into the subheader. In another example, the indication is carried by at least one reserved bit in the subheader.

In another embodiment, the indication is carried in a random access response (RAR) in the second message. For example, the indication is located before ordinary RAR content in the RAR. The ordinary RAR content may include a contention resolution identity (ID) and/or scheduling information for a third message of a 4-step random access. In one example, the indication is carried by at least one additional bit added into the RAR. In another example, the indication is carried by at least one reserved bit in the RAR.

In one embodiment, the second message indicates whether the second message is for a 2-step random access or a 4-step random access based on at least one selected from the group of: a radio network temporary identifier (RNTI) used for scrambling a downlink control channel of the second message; and a random access preamble (RAP) ID in a subheader in the second message.

The response type configurator 324 in this example may configure the response for a contention resolution for the access to the BS 300; and determine the type of the response based on the configuring. In this case, the response may include a contention resolution identity (ID) carried in the payload of the first message.

In another embodiment, the response type configurator 324 may configure the response for a fallback to a 4-step random access and for a UE that supports a 2-step random access; and determine the type of the response based on the configuring. In this case, the response may include scheduling information for a third message of the 4-step random access.

In another embodiment, the response type configurator 324 may configure the response for a negative acknowledgement (NACK) indication for a retransmission of the payload of the first message. In another embodiment, one of the plurality of types corresponds to a response that is configured for a UE that supports a 4-step random access.

The failure and fallback operator 326 in this example may perform one or more operations in response to a determination of failure or fallback. In one embodiment, the failure and fallback operator 326 may generate a negative acknowledgement (NACK) indicator for a retransmission of the payload of the first message in response to a decoding error of the payload. The failure and fallback operator 326 may inform the random access message generator 322 to generate the second message based on the NACK indicator. Then, the failure and fallback operator 326 may receive the exact payload transmitted again from the UE. The MAC layer entity in this case is still for a 2-step random access.

In another embodiment, the failure and fallback operator 326 generate an indication for a fallback to a 4-step random access in response to a decoding error of the payload, and inform the random access message generator 322 to generate the second message based on the fallback indication. Then, the failure and fallback operator 326 may receive a second payload transmitted from the UE. The second payload may or may not be the same as the original payload transmitted in the first message Msg A. The MAC layer entity in this case switches to fit a 4-step random access.

The power module 308 can include a power source such as one or more batteries, and a power regulator, to provide regulated power to each of the above-described modules in FIG. 3. In some embodiments, if the BS 300 is coupled to a dedicated external power source (e.g., a wall electrical outlet), the power module 308 can include a transformer and a power regulator.

The various modules discussed above are coupled together by a bus system 330. The bus system 330 can include a data bus and, for example, a power bus, a control signal bus, and/or a status signal bus in addition to the data bus. It is understood that the modules of the BS 300 can be operatively coupled to one another using any suitable techniques and mediums.

As used herein, the term "layer" refers to an abstraction layer of a layered model, e.g. the open systems interconnection (OSI) model, which partitions a communication system into abstraction layers. A layer serves the next higher layer above it, and is served by the next lower layer below it.

Although a number of separate modules or components are illustrated in FIG. 3, persons of ordinary skill in the art will understand that one or more of the modules can be combined or commonly implemented. For example, the processor 304 can implement not only the functionality described above with respect to the processor 304, but also implement the functionality described above with respect to the random access message analyzer 320. Conversely, each of the modules illustrated in FIG. 3 can be implemented using a plurality of separate components or elements.

Figure 4:
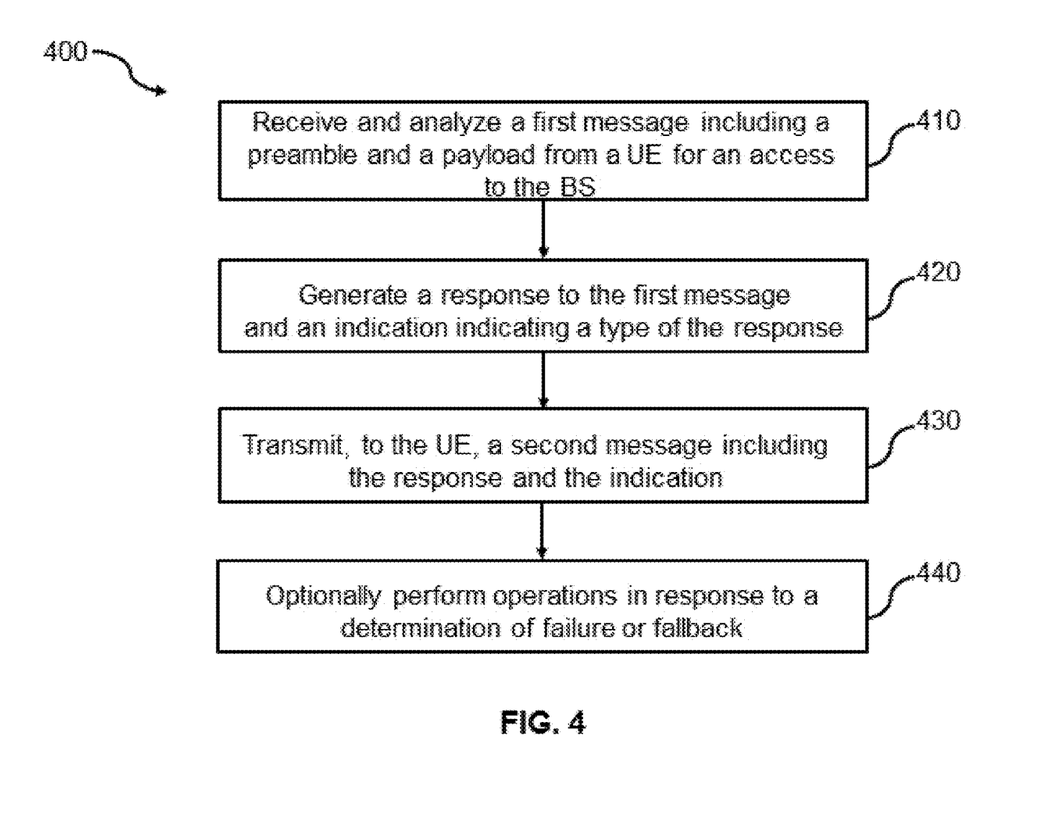
FIG. 4 illustrates a flow chart for a method performed by a BS for performing a random access procedure, in accordance with some embodiments of the present disclosure.

FIG. 4 illustrates a flow chart for a method 400 performed by a BS, e.g. the BS 300 in FIG. 3, for performing a random access procedure, in accordance with some embodiments of the present disclosure. At operation 410, the BS receives and analyzes a first message including a preamble and a payload from a UE for an access to the BS. At operation 420, the BS generates a response to the first message and an indication indicating a type of the response. At operation 430, the BS transmits, to the UE, a second message including the response and the indication. At operation 440, the BS optionally performs operations in response to a determination of failure or fallback. According to various embodiments, the order of the above operations may be changed.

Figure 5:
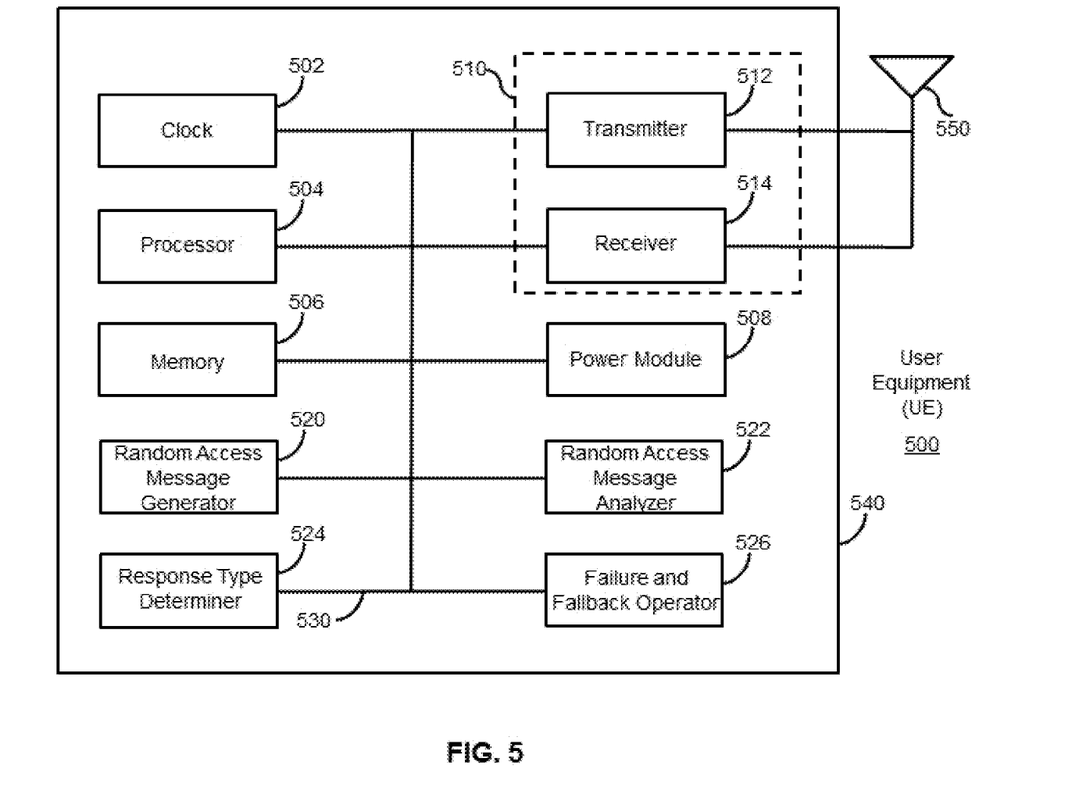
FIG. 5 illustrates a block diagram of a user equipment (UE), in accordance with some embodiments of the present disclosure.

FIG. 5 illustrates a block diagram of a user equipment (UE) 500, in accordance with some embodiments of the present disclosure. The UE 500 is an example of a device that can be configured to implement the various methods described herein. As shown in FIG. 5, the UE 500 includes a housing 540 containing a system clock 502, a processor 504, a memory 506, a transceiver 510 including a transmitter 512 and a receiver 514, a power module 508, a random access message generator 520, a random access message analyzer 522, a response type determiner 524, and a failure and fallback operator 526.

In this embodiment, the system clock 502, the processor 504, the memory 506, the transceiver 510 and the power module 508 work similarly to the system clock 302, the processor 304, the memory 306, the transceiver 310 and the power module 308 in the BS 300. An antenna 550 or a multi-antenna array 550 is typically attached to the housing 540 and electrically coupled to the transceiver 510.

In a communication system, the UE 500 may want to access a BS for data transfer. In one embodiment, the random access message generator 520 may generate a first message including a preamble and a payload for an access to the BS. The random access message generator 520 may transmit the first message via the transmitter 512 to the BS.

The random access message generator 520 may inform the random access message analyzer 522 about the first message so that the random access message analyzer 522 will monitor a response from the BS.

The random access message analyzer 522 in this example may receive, via the receiver 514 from the BS, a second message including a response to the first message. The random access message analyzer 522 may analyze the second message to determine that the second message includes an indication indicating a type of the response selected from a plurality of types.

In one embodiment, the indication is carried in downlink control information (DCI). In another embodiment, the indication is carried in a subheader in a header of the second message. The header includes at least one subheader. In one example, the indication is carried by at least one additional bit added into the subheader. In another example, the indication is carried by at least one reserved bit in the subheader.

In another embodiment, the indication is carried in a random access response (RAR) in the second message. For example, the indication is located before ordinary RAR content in the RAR. The ordinary RAR content may include a contention resolution identity (ID) and/or scheduling information for a third message of a 4-step random access. In one example, the indication is carried by at least one additional bit added into the RAR. In another example, the indication is carried by at least one reserved bit in the RAR.

In one embodiment, the second message indicates whether the second message is for a 2-step random access or a 4-step random access based on at least one selected from the group of: a radio network temporary identifier (RNTI) used for scrambling a downlink control channel of the second message; and a random access preamble (RAP) ID in a subheader in the second message.

The response type determiner 524 in this example may determine, based on the type of the response, that the response is configured for a contention resolution for the access to the BS. In this case, the response may include a contention resolution identity (ID) carried in the payload of the first message.

In another embodiment, the response type determiner 524 may determine, based on the type of the response, that the response is configured for a fallback to a 4-step random access, and is configured for a UE that supports a 2-step random access. In this case, the response may include scheduling information for a third message of the 4-step random access.

In another embodiment, the response type determiner 524 may determine, based on the type of the response, that the response is configured for a negative acknowledgement (NACK) indication for a retransmission of the payload of the first message. In another embodiment, one of the plurality of types corresponds to a response that is configured for a UE that supports a 4-step random access.

The failure and fallback operator 526 in this example may perform one or more operations in response to an indication of failure or fallback. In one embodiment, the failure and fallback operator 326 may determine that there is a negative acknowledgement (NACK) indicator in the second message for a retransmission of the payload of the first message in response to a decoding error of the payload. The failure and fallback operator 526 may inform the random access message generator 520 to retransmit, via the transmitter 512, the exact payload again to the BS, in response to the NACK indicator in the second message. The MAC layer entity in this case is still for a 2-step random access.

In another embodiment, the failure and fallback operator 526 may determine that there is an indication in the second message for a fallback to a 4-step random access in response to a decoding error of the payload. The failure and fallback operator 526 may generate and transmit, via the transmitter 512, a third message to the BS, in response to the fallback indication. The third message includes a second payload which may or may not be the same as the original payload transmitted in the first message. The MAC layer entity in this case switches to fit a 4-step random access.

The various modules discussed above are coupled together by a bus system 530. The bus system 530 can include a data bus and, for example, a power bus, a control signal bus, and/or a status signal bus in addition to the data bus. It is understood that the modules of the UE 500 can be operatively coupled to one another using any suitable techniques and mediums.

Although a number of separate modules or components are illustrated in FIG. 5, persons of ordinary skill in the art will understand that one or more of the modules can be combined or commonly implemented. For example, the processor 504 can implement not only the functionality described above with respect to the processor 504, but also implement the functionality described above with respect to the random access message generator 520. Conversely, each of the modules illustrated in FIG. 5 can be implemented using a plurality of separate components or elements.

Figure 6:
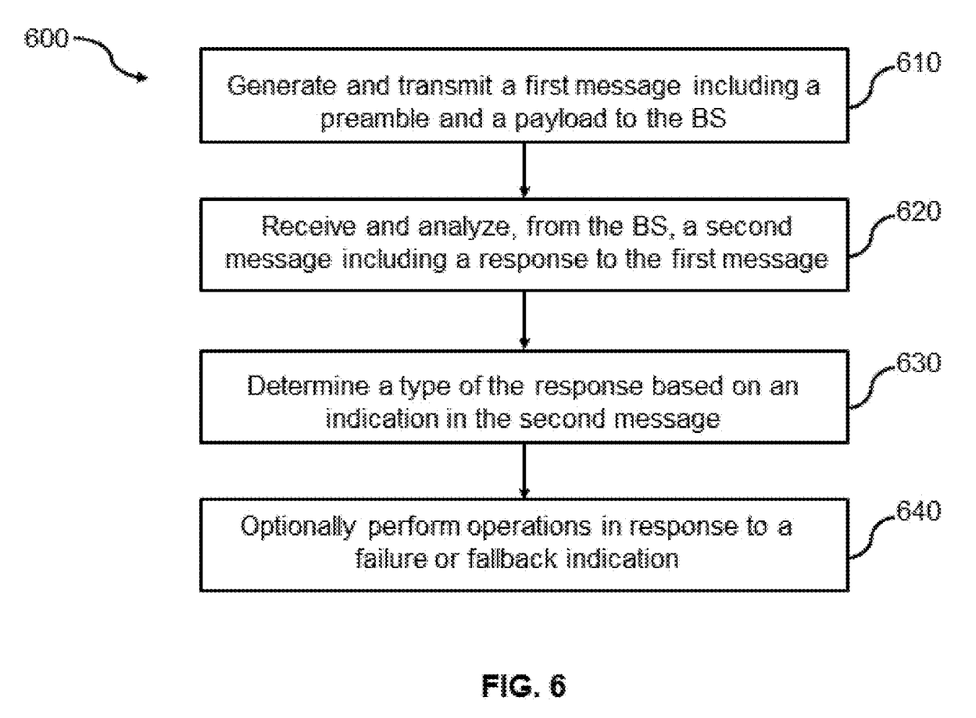
FIG. 6 illustrates a flow chart for a method performed by a UE for performing a random access procedure, in accordance with some embodiments of the present disclosure.

FIG. 6 illustrates a flow chart for a method 600 performed by a UE, e.g. the UE 500 in FIG. 5, for performing a random access procedure, in accordance with some embodiments of the present disclosure. At operation 610, the UE generates and transmits a first message including a preamble and a payload to the BS. At operation 620, the UE receives and analyzes, from the BS, a second message including a response to the first message. At operation 630, the UE determines a type of the response based on an indication in the second message. At operation 640, the UE optionally performs operations in response to a failure or fallback indication. According to various embodiments, the order of the above operations may be changed.

Different embodiments of the present disclosure will now be described in detail hereinafter. It is noted that the features of the embodiments and examples in the present disclosure may be combined with each other in any manner without conflict.

Figure 7:
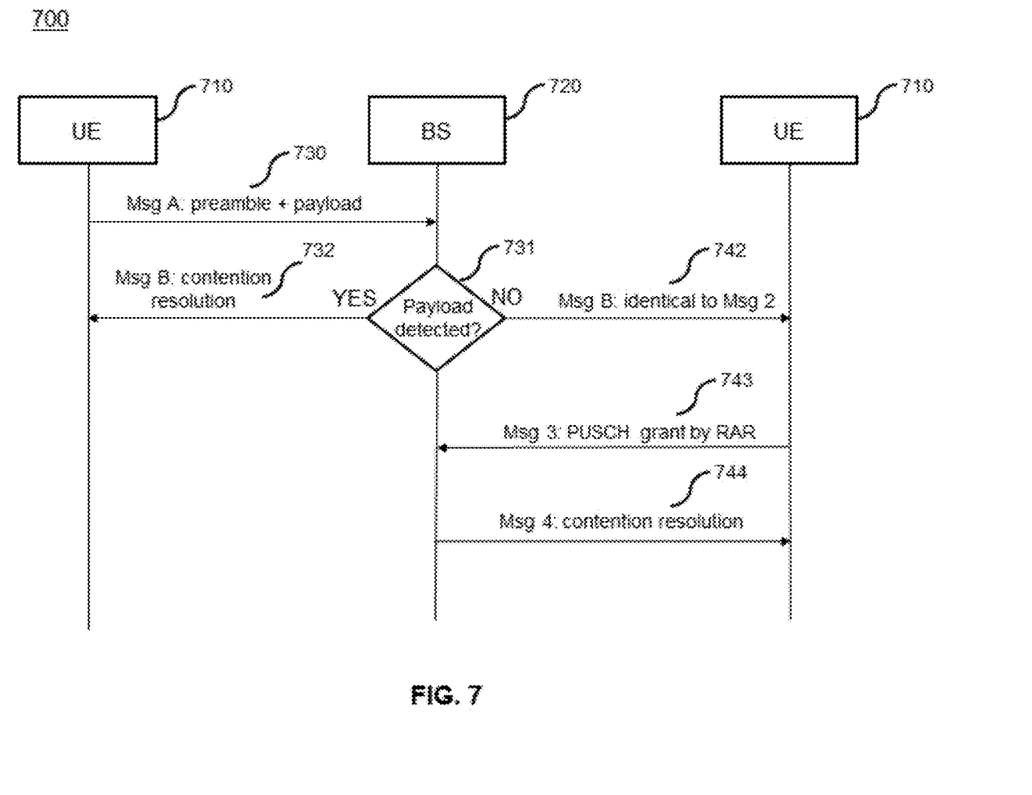
FIG. 7 illustrates an exemplary method for performing a random access procedure, in accordance with some embodiments of the present disclosure.

FIG. 7 illustrates an exemplary method 700 for performing a random access procedure, in accordance with some embodiments of the present disclosure. As shown in FIG. 7, a UE 710 transmits, at operation 730, a Msg A that includes both a preamble and a payload to a BS 720 for access to the BS 720. Then at operation 731, the BS 720 determines that whether the payload is successfully detected. If so, the BS 720 transmits at operation 732 to the UE 710 Msg B including a contention resolution ID in response to the Msg A. That is, for the case both the preamble and payload of Msg A are successfully detected and decoded, the Msg B is for a two-step RACH contention resolution. A C-RNTI or TC-RNTI disclosed in the payload can well fulfill contention resolution purpose. The UL grant could be used to schedule the possible uplink data packets right after the RACH procedure if buffer state report (BSR) is reported in Msg A.

If the BS 720 determines that the payload is not successfully detected at operation 731, the BS 720 transmits at operation 742 to the UE 710 Msg B which contains identical content as Msg 2 in a 4-step RACH. Then the UE 710 transmits at operation 743 Msg 3 including the PUSCH grant to the BS 720. In response, the BS 720 transmits at operation 744 Msg 4 including a contention resolution ID to the UE 710. That is, for the case that the preamble is successfully detected but the payload is not successfully decoded, the RACH procedure will fall back to traditional four-step RACH. The Msg B sent in the second step could be identical to a legacy Msg 2. The content of the Msg B may include a traditional RAR which includes the random access preamble identity (RAPID) as well as a TC-RNTI. The UL grant in fallback mode is for Msg 3 scheduling as in a legacy 4-step RACH.

Since the time/frequency resources for Msg A and Msg 1 are different, the RNTI used for scrambling the physical downlink control channel (PDCCH) of the second step message are different. For a two-step RACH, the second step message is Msg B and its PDCCH is scrambled by the two-step-RA-RNTI. For a four-step RACH, the second step message is Msg 2 and its PDCCH is scrambled by the traditional RA-RNTI. The two-step-RA-RNTI is derived at least from the time/frequency resources of Msg A, while the RA-RNTI for 4-step RACH is derived at least from the time/frequency resources of Msg 1. As discussed before, the time/frequency resources of Msg A and the time/frequency resources of Msg 1 are different. As such, the two-step-RA-RNTI is different from the RA-RNTI. Although the content of the Msg B of a 2-step RACH may be identical to the content of a legacy Msg 2, Msg B is different from the real Msg 2 of a four-step RACH. The MAC layer entity for Msg B in this case is still for a two-step RACH.

Msg B is used for the 2-step contention based RACH, while Msg 2 is used for the 4-step RACH. UE could distinguish whether the second message is Msg B in response to Msg A or Msg 2 in response to Msg 1, based on a determination that whether the PDCCH scramble code is two-step-RA-RNTI or RA-RNTI.

Figure 8:
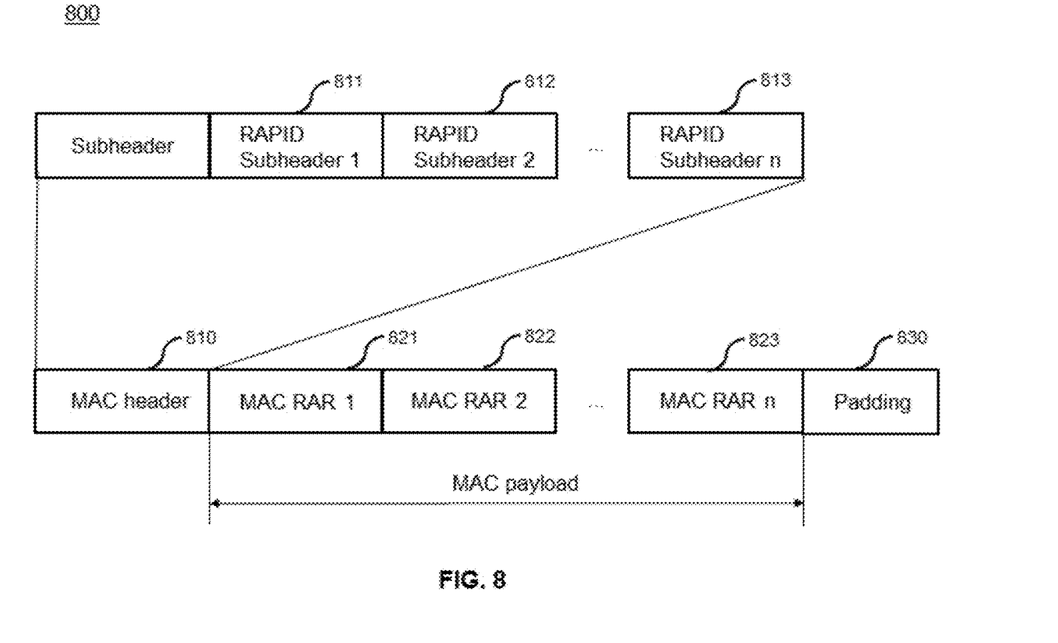
FIG. 8 illustrates a basic medium access control (MAC) structure for a message in a random access procedure.

FIG. 8 illustrates a basic medium access control (MAC) protocol data unit (PDU) structure 800 for a message in a random access procedure. As shown in FIG. 8, a MAC PDU 800 carried by the physical downlink shared channel (PDSCH) of Msg B may include a MAC header 810, MAC RARs 821, 822, 823 (MAC payload), and a padding 830. The PDSCH is scheduled by the DCI of Msg B. The MAC header 810 includes the RAPID subheaders which include in this example at least the detected RAPID k 811, 812, 813 corresponding to the MAC RAR k 821, 822, 823, where k=1, 2 . . . n. That is, the Msg B includes one or multiple MAC RARs depending on the number of detected preamble index (RAPID) in the same Msg A time/frequency resource.

The network cannot guarantee that the payloads of all Msg A's are decoded. One possibility is that some UEs' preambles are detected but their payloads are not decoded, and some other UE's preambles and payloads are both successfully detected and decoded. If all the above mentioned UEs' Msg A responses need to be carried in a same Msg B, the cascaded MAC RARs corresponding to different RAPIDs may be different. Some are for a contention resolution, while the others are for a fall back mode.

As such, there are at least two options for the type or function of a MAC RAR. One option is for normal contention resolution as long as the payload is successfully decoded, where the contention resolution means the MAC RAR contains the contention resolution ID which is carried in the payload of Msg A. The other option is for a fall back mode when the preamble is successfully detected but the payload is not successfully decoded. The fall back mode means the MAC RAR contains a Msg 3 scheduling message.

Figure 10:
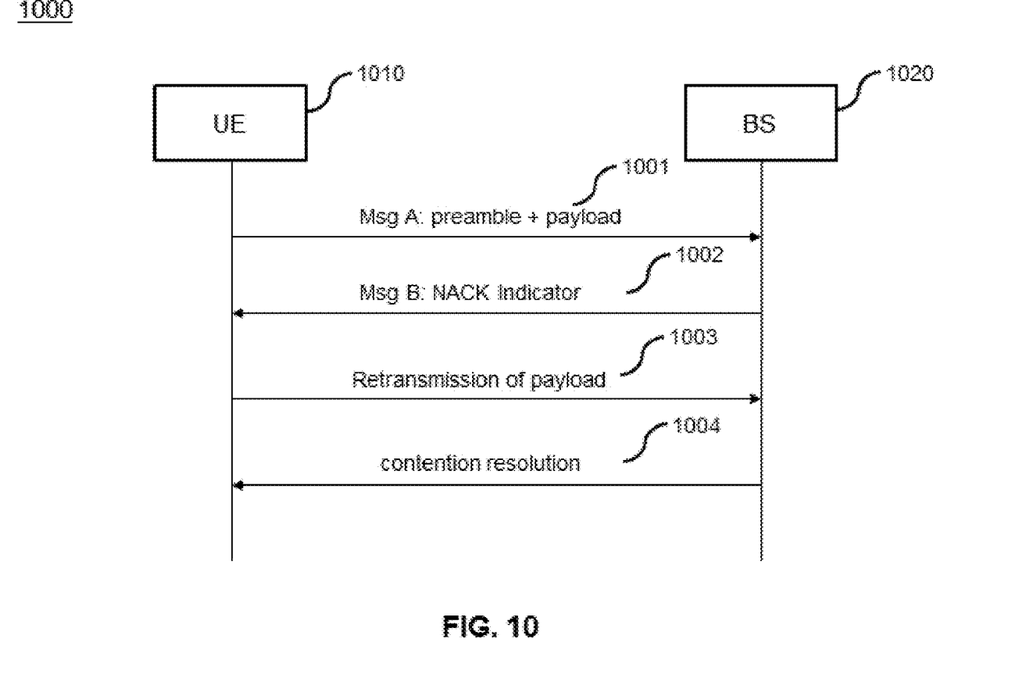
FIG. 10 illustrates another exemplary method for performing a random access procedure, in accordance with some embodiments of the present disclosure.

The network can indicate UE in the Msg B which option the MAC RAR corresponds to, and indicate whether the payload is successfully decoded or the MAC RAR is for fall back mode or for the NACK indication of payload which will be described in detail referring to FIG. 10. Without the indication, UE may no longer distinguish the type or function of MAC RAR and misunderstand the content of MAC RAR. The indication for type or function of MAC RAR can be carried in the DCI (downlink control information) of Msg B, or carried in the MAC header or MAC RAR content.

The indication carried in the DCI is commonly used for all the MAC RARs in Msg B. So when the Msg B includes only one MAC RAR, this kind of indication is suitable. While when multiple MAC RARs are included in the Msg B, it is preferable that the indication for the type or function of MAC RAR is carried in the MAC RAR itself or the MAC subheader which can individually indicate the type or function of each MAC RAR. If the indication bits are in the MAC subheader, the indication bits may use the reserved bits in a traditional MAC subheader or use some new bits added into a traditional MAC subheader. If the indication bits are carried in a MAC RAR, the indication bits may be placed before the ordinary RAR content which includes the details of contention resolution ID or Msg 3 scheduling message. The indication bits can reuse the reserved bits in MAC RAR or newly added bits in MAC RAR.

Figure 9:
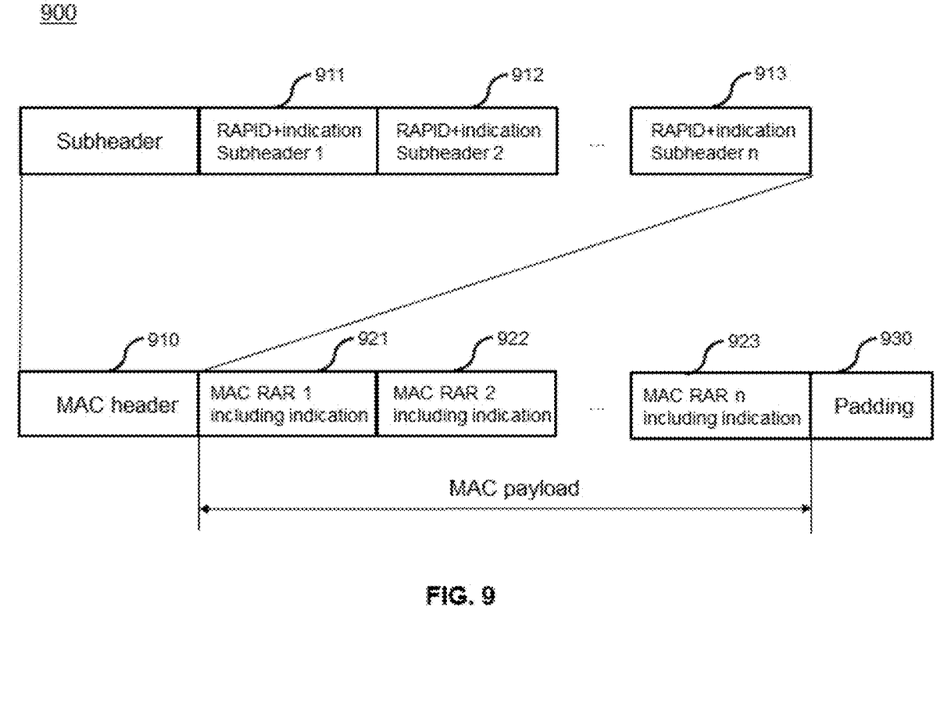
FIG. 9 illustrates a detailed exemplary MAC structure for a message in a random access procedure, in accordance with some embodiments of the present disclosure.

FIG. 9 illustrates a detailed exemplary MAC PDU structure 900 for a message in a random access procedure, in accordance with some embodiments of the present disclosure. As shown in FIG. 9, a MAC PDU 900 carried by the PDSCH of Msg B may include a MAC header 910, MAC RARs 921, 922, 923 (MAC payload), and a padding 930. The MAC header 910 includes the RAPID subheaders 911, 912, 913 each of which in this example may include a RAPID and a RAR type indication for a corresponding one of the MAC RARs 921, 922, 923. According to various embodiments, one or more of the subheaders 911, 912, 913 include RAR type indications, while other subheaders do not. In addition, each of the MAC RARs 921, 922, 923 may include a RAR type indication for the RAR itself. According to various embodiments, one or more of the MAC RARs 921, 922, 923 include RAR type indications, while other MAC RARs do not.

In addition to the above two options for the type of a MAC RAR, a MAC RAR may also indicate a NACK to a UE when the preamble is successfully detected but the payload is not successfully decoded. When the UE gets the NACK indication, the UE will retransmit the exact payload again but without the preamble. FIG. 10 illustrates another exemplary method 1000 for performing a random access procedure, in accordance with some embodiments of the present disclosure. As shown in FIG. 10, a UE 1010 transmits, at operation 1001, a Msg A that includes both a preamble and a payload to a BS 1020 for access to the BS 1020. Then at operation 1002, the BS 1020 transmits to the UE 1010 Msg B including a NACK indicator in response to the Msg A, after the BS 1020 determines that the preamble is successfully detected but the payload is not successfully decoded. At operation 1003, the UE 1010 retransmits the same payload in Msg A to the BS 1020. Then at operation 1004, the BS 1020 may transmit to the UE 1010 a message for contention resolution.

As discussed above, when the time/frequency resources for Msg A and Msg 1 are different, then the RNTI used for scrambling the PDCCH of the second step message are different. The UE could distinguish whether the second message for response of Msg A or Msg 1 is a Msg B and a Msg 2, based on the PDCCH scramble code. But in case the time/frequency resources for Msg A and Msg 1 are same, the RNTI used for scrambling the PDCCH of the second step message cannot be used to distinguish between the Msg B and the Msg 2. In that case, the UE could distinguish between the Msg B and Msg 2 based on the different preamble indices used for Msg A and Msg 1. For example, it may be pre-determined that one group of preamble indices are used for Msg A, Msg B, and 2-step RACH, while another group of preamble indices are used for Msg 1, Msg 2, and 4-step RACH.

In another embodiment, as the preamble index will be included in the Msg B MAC subheader, it means one of the MAC RARs in Msg B may be the MAC RAR for a traditional 4-step RACH. That is, another option for the type or function of a MAC RAR in Msg B is that the MAC RAR in Msg B is a traditional MAC RAR of Msg 2. This may be configured for a UE that can only support a 4-step RACH. It is possible that a BS serves multiple UEs, where some of the UEs support a 2-step RACH, while other UEs support a 4-step UE. The traditional MAC RAR of Msg 2 contains time advance (TA), UL grant of Msg 3, and TC-RNTI, etc.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication device, the method comprising:
    transmitting, to a wireless communication node, a first message comprising a preamble and a payload for an access to the wireless communication node;
    receiving, from the wireless communication node, a second message comprising a response to the first message, wherein the second message comprises a medium access control (MAC) protocol data unit (PDU), and wherein the MAC PDU comprises an indication indicating a type of the response from a plurality of types; and
    determining, based on the type of the response, that the response is configured for: a negative acknowledgement (NACK) indication for a retransmission of the payload of the first message in a 2-step random access procedure, in response to a decoding error, or a fallback from a 2-step random access procedure to a 4-step random access procedure, or a contention resolution for the 2-step random access procedure, or the 4-step random access procedure,
    wherein the indication is carried in a MAC subheader in a MAC header of the second message, wherein the MAC header comprises at least one MAC subheader.

2. The method of claim 1, wherein the response further includes at least one MAC payload comprising at least one random access response (RAR) associated with the at least one MAC subheader.

3. The method of claim 1, wherein the indication is carried by at least one additional bit added into the MAC subheader or at least one reserved bit in the MAC subheader.

4. The method of claim 1, wherein the second message indicates whether the second message is for the 2-step random access procedure or the 4-step random access procedure based on a radio network temporary identifier (RNTI) used for scrambling a downlink control channel of the second message.

5. A method performed by a wireless communication node, the method comprising:
    receiving, from a wireless communication device, a first message comprising a preamble and a payload for an access to the wireless communication node;
    transmitting, to the wireless communication device, a second message comprising a response to the first message, wherein the second message comprises a medium access control (MAC) protocol data unit (PDU), and wherein the MAC PDU comprises an indication indicating a type of the response from a plurality of types; and determining, based on the type of the response, that the response is configured for a negative acknowledgement (NACK) indication for a retransmission of the payload of the first message in a 2-step random access procedure, in response to a decoding error, or a fallback from a 2-step random access procedure to a 4-step random access procedure, or a contention resolution for the 2-step random access procedure, or the 4-step random access procedure;

wherein the indication is carried in a MAC subheader in a MAC header of the second message, wherein the MAC header comprises at least one MAC subheader.

6. The method of claim 5, wherein the response further includes at least one MAC payload comprising at least one random access response (RAR) associated with the at least one MAC subheader.

7. The method of claim 5, wherein the indication is carried by at least one additional bit added into the MAC subheader or at least one reserved bit in the MAC subheader.

8. The method of claim 5, wherein the second message indicates whether the second message is for the 2-step random access procedure or the 4-step random access procedure based on a radio network temporary identifier (RNTI) used for scrambling a downlink control channel of the second message.

9. A wireless communication device comprising:

memory circuitry configured to store computer-executable instructions;

a processor configured to load the computer-executable instructions to perform steps comprising:

transmitting, to a wireless communication node, a first message comprising a preamble and a payload for an access to the wireless communication node;

receiving, from the wireless communication node, a second message comprising a response to the first message, wherein the second message comprises a medium access control (MAC) protocol data unit (PDU), and wherein the MAC PDU comprises an indication indicating a type of the response from a plurality of types; and determining, based on the type of the response, that the response is configured for a negative acknowledgement (NACK) indication for a retransmission of the payload of the first message in a 2-step random access procedure, in response to a decoding error, or a fallback from a 2-step random access procedure to a 4-step random access procedure, or a contention resolution for the 2-step random access procedure, or the 4-step random access procedure;

wherein the indication is carried in a MAC subheader in a MAC header of the second message, wherein the MAC header comprises at least one MAC subheader.

10. The wireless communication device of claim 9, wherein the response further includes at least one MAC Payload comprising at least one random access response (RAR) associated with the at least one MAC subheader.

11. The wireless communication device of claim 9, wherein the indication is carried by at least one additional bit added into the MAC subheader or at least one reserved bit in the MAC subheader.

12. The wireless communication device of claim 9, wherein the second message indicates whether the second message is for the 2-step random access procedure or the 4-step random access procedure based on a radio network temporary identifier (RNTI) used for scrambling a downlink control channel of the second message.

13. The wireless communication node configured to carry out the method of claim 5.

14. A non-transitory computer-readable medium having stored thereon computer-executable instructions for carrying out the method of claim 1.

* * * * *